United States Patent
Ogawa et al.

(10) Patent No.: US 10,924,296 B2
(45) Date of Patent: Feb. 16, 2021

(54) TERMINAL APPARATUS, CONTROL APPARATUS, INSTALLATION-LOCATION-ASCERTAINMENT SUPPORT SYSTEM, INSTALLATION-LOCATION-SETTING SUPPORT SYSTEM, INSTALLATION-LOCATION-ASCERTAINMENT SUPPORT METHOD, INSTALLATION-LOCATION-SETTING SUPPORT METHOD, AND PROGRAM

(71) Applicant: Mitsubishi Electric Corporation, Tokyo (JP)

(72) Inventors: Yuki Ogawa, Tokyo (JP); Hirotoshi Yano, Tokyo (JP); Masaaki Yabe, Tokyo (JP); Satoshi Minezawa, Tokyo (JP); Ichiro Maruyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/775,342

(22) Filed: Jan. 29, 2020

(65) Prior Publication Data

US 2020/0169428 A1  May 28, 2020

Related U.S. Application Data

(62) Division of application No. 14/917,320, filed as application No. PCT/JP2013/080835 on Nov. 14, 2013, now Pat. No. 10,594,506.

(51) Int. Cl.
*H04L 12/28* (2006.01)
*G06F 13/38* (2006.01)
(Continued)

(52) U.S. Cl.
CPC .......... *H04L 12/2803* (2013.01); *F24F 11/48* (2018.01); *F24F 11/49* (2018.01);
(Continued)

(58) Field of Classification Search
CPC .. H04L 12/2803; H04L 12/2809; F24F 11/57; F24F 11/48; F24F 11/64;
(Continued)

(56) References Cited

U.S. PATENT DOCUMENTS

2002/0091812 A1  7/2002  Ando et al.
2004/0199272 A1  10/2004  Yamamoto et al.
(Continued)

FOREIGN PATENT DOCUMENTS

| CN | 1662888 A | 8/2005 |
|---|---|---|
| CN | 202815465 U | 3/2013 |

(Continued)

OTHER PUBLICATIONS

International Search Report of the International Searching Authority dated Jan. 28, 2014 for the corresponding international application No. PCT/JP2013/080835 (and English translation).
(Continued)

*Primary Examiner* — Mohammad Ali
*Assistant Examiner* — Joshua T Sanders
(74) *Attorney, Agent, or Firm* — Posz Law Group, PLC

(57) ABSTRACT

A device information acquirer acquires device information of each electrical device of a plurality of electrical devices from a control apparatus. A device information display associates and displays on a screen an identifier, an expected installation location, and a device state for each electrical device based on the device information of each electrical device acquired by the device information acquirer. The device information acquirer acquires from the control apparatus the device state information of an electrical device of
(Continued)

interest newly collected by the control apparatus after the electrical device installed at the expected installation location of the electrical device of interest is operated by the user. The device information display explicitly shows on the screen whether the device state of the electrical device has changed due to the operation by the user based on the device state information of the electrical device of interest acquired by the device information acquirer.

8 Claims, 15 Drawing Sheets

(51) Int. Cl.
    F24F 11/57    (2018.01)
    F24F 11/52    (2018.01)
    G05B 15/02    (2006.01)
    F24F 11/48    (2018.01)
    F24F 11/64    (2018.01)
    F24F 11/49    (2018.01)
    G05B 19/042   (2006.01)
    G06F 3/0482   (2013.01)
    G06F 3/0484   (2013.01)

(52) U.S. Cl.
    CPC .............. *F24F 11/52* (2018.01); *F24F 11/57* (2018.01); *F24F 11/64* (2018.01); *G05B 15/02* (2013.01); *G05B 19/042* (2013.01); *G06F 3/0482* (2013.01); *G06F 3/04847* (2013.01); *G06F 13/385* (2013.01); *H04L 12/2809* (2013.01); *G05B 2219/25011* (2013.01); *G05B 2219/2642* (2013.01); *H04L 2012/285* (2013.01)

(58) Field of Classification Search
    CPC ........... F24F 11/49; F24F 11/52; G05B 15/02; G05B 19/042; G06F 3/0482; G06F 3/04847; G06F 13/385

USPC ....................................................... 700/275
See application file for complete search history.

(56) References Cited

U.S. PATENT DOCUMENTS

| | | |
|---|---|---|
| 2005/0131931 A1 | 6/2005 | Kawajiri |
| 2005/0131991 A1 | 6/2005 | Ogawa et al. |
| 2005/0159823 A1 | 7/2005 | Hayes et al. |
| 2006/0036354 A1 | 2/2006 | Maekawa et al. |
| 2014/0365018 A1 | 12/2014 | Kusukame et al. |

FOREIGN PATENT DOCUMENTS

| | | |
|---|---|---|
| JP | H05-083764 A | 4/1993 |
| JP | H11-069462 A | 3/1999 |
| JP | 2001-092762 A | 4/2001 |
| JP | 2002-189648 A | 7/2002 |
| JP | 2004-023757 A | 1/2004 |
| JP | 2005-198252 A | 7/2005 |
| JP | 2006-270205 A | 10/2006 |
| JP | 2009-282778 A | 12/2009 |
| JP | 2009-284250 A | 12/2009 |
| JP | 2011-055121 A | 3/2011 |
| JP | 2013-161153 A | 8/2013 |

OTHER PUBLICATIONS

Office Action dated Mar. 14, 2017 issued in corresponding JP patent application No. 2015-547339 (and English translation).
Office Action dated Jul. 4, 2018 issued in corresponding CN patent application No. 201380080908.1 (and English translation).
Galitz, The Essential Guide to User Interface Design, 2002, Wiley Computer Publishing, 2nd Edition, pp. 100-101 (and front matter), (Year: 2002).

FIG. 6

| Electrical Device | Installation Location | Device State | Update Button |
|---|---|---|---|
| AIR CONDITIONER 1 | Living Room | Not Running | Individual Update |
| AIR CONDITIONER 2 | Study | Not Running | Individual Update |
| AIR CONDITIONER 3 | Bedroom | Not Running | Individual Update — 604 |
| | | | Collective Update — 605 |

Installation Location Check Screen (600)

601 — Electrical Device
602 — Installation Location
603 — Device State

FIG. 7

| Electrical Device | Installation Location | Device State | Update Button |
|---|---|---|---|
| AIR CONDITIONER 1 | Living Room | Not Running | Individual Update |
| AIR CONDITIONER 2 | Study | Not Running | Individual Update |
| AIR CONDITIONER 3 | Bedroom | Cooling | Individual Update |

Installation Location Check Screen — 610

601, 602, 603, 604 (Individual Update), 605 (Collective Update)

TERMINAL APPARATUS, CONTROL APPARATUS, INSTALLATION-LOCATION-ASCERTAINMENT SUPPORT SYSTEM, INSTALLATION-LOCATION-SETTING SUPPORT SYSTEM, INSTALLATION-LOCATION-ASCERTAINMENT SUPPORT METHOD, INSTALLATION-LOCATION-SETTING SUPPORT METHOD, AND PROGRAM

CROSS REFERENCE TO RELATED APPLICATIONS

This application is a divisional of U.S. application Ser. No. 14/917,320 filed on Mar. 8, 2016, which is a U.S. national stage application of International Patent Application No. PCT/JP2013/080835 filed on Nov. 14, 2013, the contents of which are incorporated herein by reference.

TECHNICAL FIELD

The present disclosure relates to a terminal apparatus, control apparatus, installation location check support system, installation location setting support system, installation location check support method, installation location setting support method, and program that can support proper setting of a control apparatus to proper locations where electrical devices are installed.

BACKGROUND

Currently, home network systems for controlling and/or monitoring electrical devices present in a house using a control apparatus such as a gateway are known. Such home network systems allow the users to control and/or monitor the electrical devices using the control apparatus or a terminal apparatus connected to the control apparatus.

Here, for improved convenience, techniques are known for storing installation location information presenting the locations where the electrical devices are installed in the control apparatus or the like and using the stored installation location information for various kinds of control. For example, Patent Literature 1 discloses an equipment control system using installation location information of devices stored in the location information storing means for device control.

Patent Literature

Patent Literature 1: Unexamined Japanese Patent Application Kokai Publication No. 2011-55121

In the equipment control system disclosed in the Patent Literature 1 or the like, if some installation location information of devices stored in the location information storing means is wrong, the device control will not properly be executed. However, the equipment control system disclosed in the Patent Literature 1 uses technology that is implemented on the assumption that the installation location information of devices stored in the location information storing means is correct. Therefore, the Patent Literature 1 discloses absolutely no method of properly setting the installation location information. For that reason, there is a demand for a technique that can support setting of a control apparatus for the correct locations where electrical devices are installed.

SUMMARY

The present disclosure is made with in view of the above problem and an objective of the disclosure is to provide a terminal apparatus, control apparatus, installation location check support system, installation location setting support system, installation location check support method, installation location setting support method, and program that can support setting of a control apparatus for proper locations where electrical devices are installed.

In order to achieve the above objective, the terminal apparatus according to the present disclosure comprises:

device information acquisition means for acquiring device information of each electrical device of a plurality of electrical devices from a control apparatus configured to collect from each electrical device device state information indicating a device state of an electrical device, and store the device information of each electrical device including information indicating an identifier identifying the electrical device, information indicating an expected installation location expected to be a location where the electrical device is installed, and the collected device state information; and device information display means for associating and displaying on a screen the identifier, the expected installation location, and the device state for each electrical device based on the device information of each electrical device acquired by the device information acquisition means, wherein the device information acquisition means acquires from the control apparatus device state information of an electrical device of interest that is the electrical device identified with an identifier a user is interested in, the device state information being newly collected by the control apparatus after the electrical device installed at the expected installation location displayed on the screen in association with the identifier the user is interested in among the identifiers displayed on the screen by the device information display means is operated by the user; and the device information display means explicitly shows on the screen whether the device state of the electrical device of interest has changed due to the operation by the user based on the device state information of the electrical device of interest acquired by the device information acquisition means.

The present disclosure can support proper setting of a control apparatus for proper locations where electrical devices are installed.

BRIEF DESCRIPTION OF DRAWINGS

FIG. 6 is an illustration showing an installation location check screen on which update buttons are displayed;

FIG. 7 is an illustration showing an installation location check screen after an individual update button is pressed;

DETAILED DESCRIPTION

Embodiments of the present disclosure are described hereafter with reference to the drawings.

Embodiment 1

First, an installation location check support system 1000 according to Embodiment 1 of the present disclosure is described. The installation location check support system 1000 is applicable to a home network system controlling or monitoring electrical devices 210, 220, and 230 installed in a house from a control apparatus 100. Here, the installation location check support system 1000 is a system supporting the user, using a terminal apparatus 300, to check whether the installation locations of the electrical device 210 and the like set (registered) in the control apparatus 100 are correct.

On the other hand, the user operates an electrical device installed at an installation location set in the control apparatus 100 as the installation location of a target electrical device (an expected installation location), and determines whether the device state of the target electrical device displayed on the screen of the terminal apparatus 300 changes. Then, the user can determine that the installation location is correct if the device state of the target electrical device changes on the screen, or determine that the installation location is not correct if the device state of the target electrical device does not change on the screen.

Here, if the user finds that the registered installation location is not correct, using the control apparatus 100 or terminal apparatus 300, the user can then set a correct installation location in the control apparatus 100.

Figure 1:
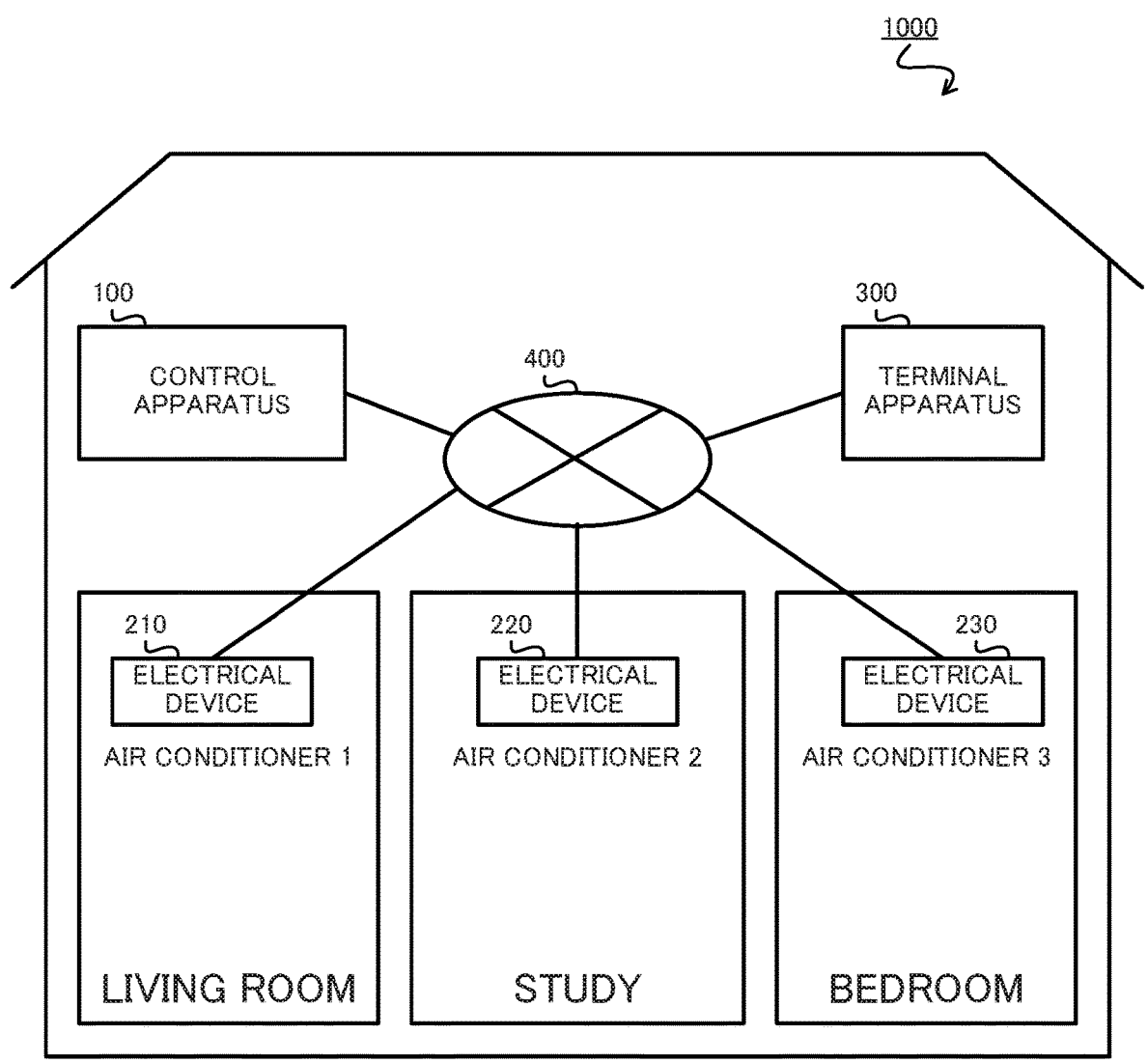
FIG. 1 is an illustration for explaining a summary of the installation location check support system according to Embodiment 1 of the present disclosure.

As shown in FIG. 1, the installation location check support system 1000 includes the control apparatus 100 controlling or monitoring the electrical device 210 and the like, the electrical devices 210, 220, and 230 to be controlled or monitored, the terminal apparatus 300 operating the control apparatus 100, and an indoor telecommunication network 400 interconnecting the apparatuses of the installation location check support system 1000.

The control apparatus 100 controls or monitors the electrical devices 210, 220, 230, and the like via the indoor telecommunication network 400 according to instructions from the user, instructions from the terminal apparatus 300, automated programs, and the like. Therefore, the control apparatus 100 includes an interface for connection to the indoor telecommunication network 400. Moreover, the control apparatus 100 manages the identification of where each of the electrical devices 210, 220, and 230 is installed in the house.

Here, the method for the control apparatus 100 to manage the identification of installation locations of the electrical devices 210, 220, and 230 can be appropriately modified. For example, the control apparatus 100 can display a screen receiving input of installation locations of the electrical devices 210, 220, and 230 on a touch screen 16, and can receive input of the installation locations from the user. Alternatively, the control apparatus 100 may receive information presenting the installation locations ("installation location information" as appropriate hereafter) from the terminal apparatus 300 and the like. Then, the control apparatus 100 stores the installation location information in a flash memory 14 in association with information presenting identifiers of the electrical devices 210, 220, and 230 ("identifier information" as appropriate hereafter).

Here, the installation locations entered by the user or the like are not always correct and may be wrong in some cases. Then, the installation location check support system 1000 supports the user in checking whether the installation locations managed by the control apparatus 100 are correct.

The electrical devices 210, 220, and 230 are each a device to be controlled or monitored, and are installed, for example, in the user's house. The electrical devices 210, 220, and 230 each communicate with the control apparatus 100 via the indoor telecommunication network 400. Therefore, the electrical devices 210, 220, and 230 each include an interface for making connection to the indoor telecommunication network 400. The electrical devices 210, 220, and 230 each basically execute an operation according to contents of a request frame received from the control apparatus 100 and send to the control apparatus 100 a response frame in response to the request frame.

Each of the electrical devices 210, 220, and 230 is, for example, an appliance such as an air conditioner, water heater, electrical heater, rice cooker, lighting apparatus, or electrical carpet. In this embodiment, the electrical device 210 is assumed to be an air conditioner installed in the living room (air conditioner 1), the electrical device 220 is assumed to be an air conditioner installed in the study (air conditioner 2), and the electrical device 230 is assumed to be an air conditioner installed in the bedroom (air conditioner 3). Here, when multiple electrical devices of the same kind are present in the house as in this case, the user is can be considered to be likely to misidentify an electrical device and register a wrong installation location in the control apparatus 100.

The terminal apparatus 300 functions as an interface of the control apparatus 100. Therefore, the terminal apparatus 300 has a function for making connection to the indoor telecommunication network 400 and communicates with the control apparatus 100 via the indoor telecommunication network 400. For example, the terminal apparatus 300 sends control signals for remote control to the control apparatus 100 according to instructions from the user so as to remotely control the electrical devices 210, 220, and 230. Moreover, the terminal apparatus 300 monitors the operation states of the electrical devices 210, 220, and 230 and the like via the control apparatus 100. In this embodiment, the terminal apparatus 300 functions as a tool for supporting the user in checking the installation locations set in the control apparatus 100. The terminal apparatus 300 is, for example, a smartphone, cell-phone, or tablet terminal.

The indoor telecommunication network 400 is a telecommunication network such as a wireless local area network (LAN) established within the house. The indoor telecommunication network 400 interconnects the control apparatus 100, electrical device 210, electrical device 220, electrical device 230, and terminal apparatus 300. Here, the terminal apparatus 300 may be connected to the control apparatus 100 via a telecommunication network established outside the house such as the Internet, rather than via the indoor telecommunication network 400.

Figure 2:
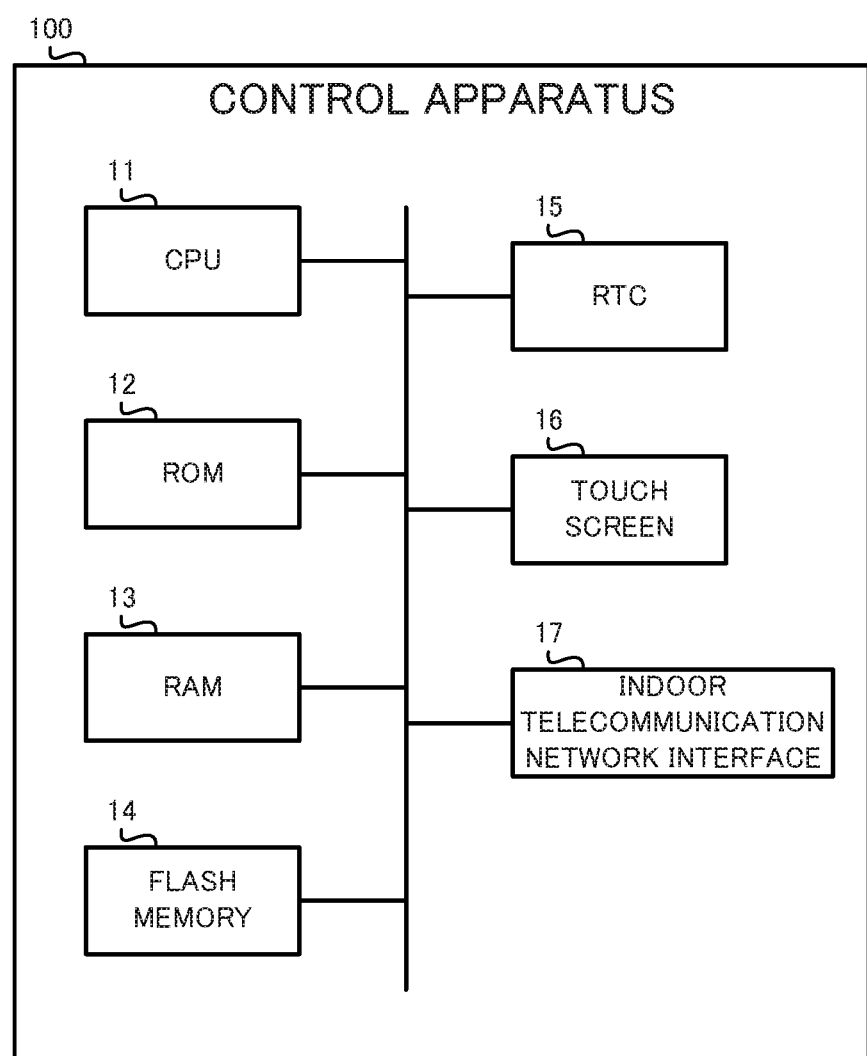
FIG. 2 is a block diagram showing the configuration of the control apparatus according to Embodiment 1 of the present disclosure.

The physical configuration of the control apparatus 100 is described next with reference to FIG. 2. As shown in FIG. 2, the control apparatus 100 includes a central processing unit (CPU) 11 for controlling the entire operation of the control apparatus 100, a read only memory (ROM) 12 for storing programs executed by the CPU 11, a random access memory (RAM) 13 functioning as the work area of the CPU 11, the flash memory 14 for storing various kinds of information, a real time clock (RTC) 15 that is a device for measuring the time, the touch screen 16 functioning as a user interface of the control apparatus 100, and an indoor telecommunication network interface 17 connecting the control apparatus 100 to the indoor telecommunication network 400. The components of the control apparatus 100 are interconnected via a bus.

The CPU 11 controls the entire operation of the control apparatus 100. Here, the CPU 11 operates according to programs stored in the ROM 12 and uses the RAM 13 as a work area.

The ROM 12 stores programs and data for controlling the entire operation of the control apparatus 100.

The RAM 13 functions as the work area of the CPU 11. In other words, the CPU 11 temporarily writes programs and data in the RAM 13 and appropriately refers to the programs and data.

The flash memory 14 is a nonvolatile memory for storing various kinds of information. Here, the control apparatus 100 may include a hard disk or the like rather than the flash memory 14. Moreover, the control apparatus 100 may store various kinds of information in the terminal apparatus 300 connected to the indoor telecommunication network 400 or in a non-illustrated storage connected to the indoor telecommunication network 400.

The RTC 15 is a device for measuring the time. The RTC 15 includes, for example, a built-in battery and continues to measure the time even while the control apparatus 100 is powered off. The RTC 15 includes, for example, an oscillation circuit comprising a crystal oscillator.

The touch screen 16 detects touch operations conducted by the user and supplies signals presenting the detected results to the CPU 11. Moreover, the touch screen 16 displays images based on image signals supplied from the CPU 11 and the like. As just described, the touch screen 16 functions as the user interface of the control apparatus 100.

The indoor telecommunication network interface 17 connects the control apparatus 100 to the indoor telecommunication network 400. The indoor telecommunication network interface 17 communicates with the electrical devices 210, 220, and 230 and terminal apparatus 300 according to control by the CPU 11. The indoor telecommunication network interface 17 comprises, for example, a LAN interface such as a network interface card (NIC).

Figure 3:
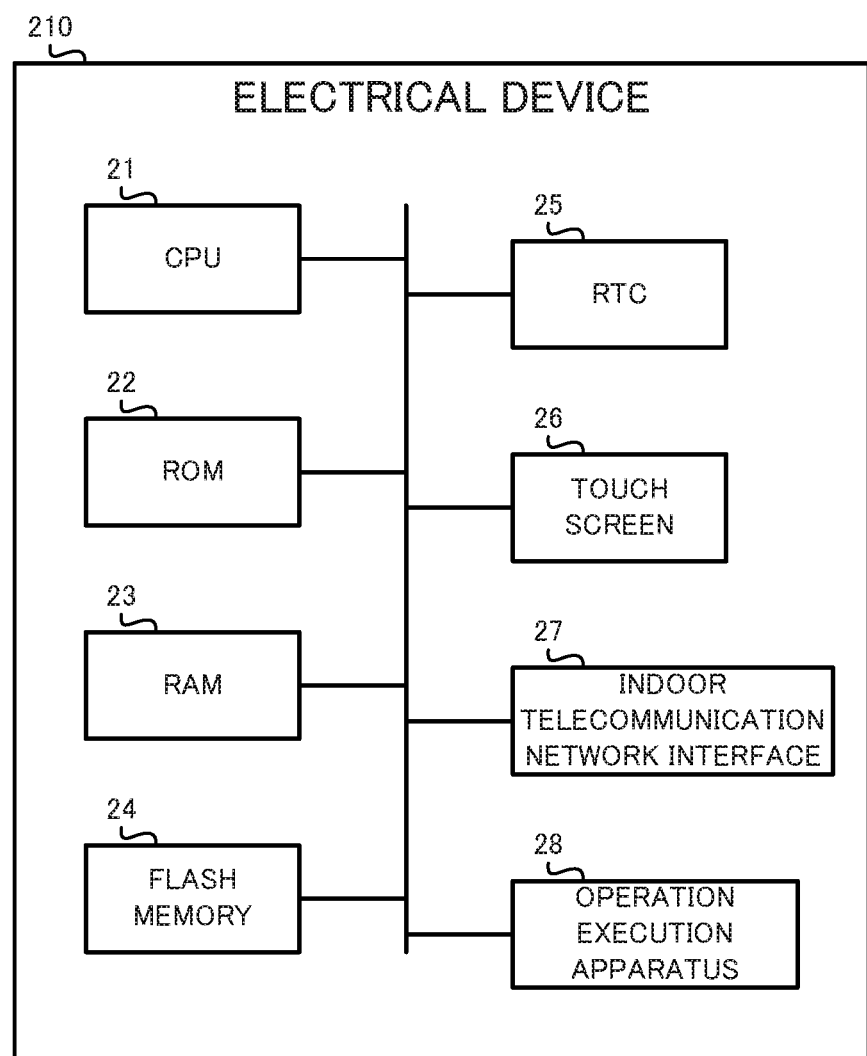
FIG. 3 is a block diagram showing the configuration of an electrical device according to Embodiment 1 of the present disclosure.

The physical configuration of the electrical device 210 is described next with reference to FIG. 3. As shown in FIG. 3, the electrical device 210 includes a CPU 21 controlling the entire operation of the electrical device 210, a ROM 22 storing programs executed by the CPU 21 and the like, a RAM 23 functioning as the work area of the CPU 21, a flash memory 24 storing various kinds of information, an RTC 25 that is a device for measuring the time, a touch screen 26 functioning as the user interface of the electrical device 210, an indoor telecommunication network interface 27 connecting the electrical device 210 to the indoor telecommunication network 400, an operation execution apparatus 28 executing operations corresponding to the function of the electrical device 210. The components of the electrical device 210 are interconnected via a bus. The electrical device 210 has basically the same configuration as the control apparatus 100, except for the operation execution apparatus 28, and thus explanation thereof is omitted.

The operation execution apparatus 28 executes operations corresponding to the functions of the electrical device 210. For example, when the electrical device 210 is an air conditioner, the operation execution apparatus 28 executes air conditioning operations, such as temperature setting, cooling, heating, dehumidification and air blowing. For example, when the electrical device 210 is a lighting apparatus, the operation execution apparatus 28 executes operations of turning on and turning off the light. The operation execution apparatus 28 executes, for example, an operation according to the contents of a request frame supplied from the control apparatus 100. Moreover, for example, a response frame containing the results of an operation by the operation execution apparatus 28 is supplied to the control apparatus 100. Here, basically, as the operation execution apparatus 28 executes an operation, the device state of the electrical device 210 changes.

Here, the electrical device 220 and electrical device 230 can comprise the same configuration as the electrical device 210. However, the operation execution apparatus 28 of the electrical device 220 executes operations corresponding to the function of the electrical device 220 and the operation execution apparatus 28 of the electrical device 230 executes operations corresponding to the function of the electrical device 230.

Figure 4:
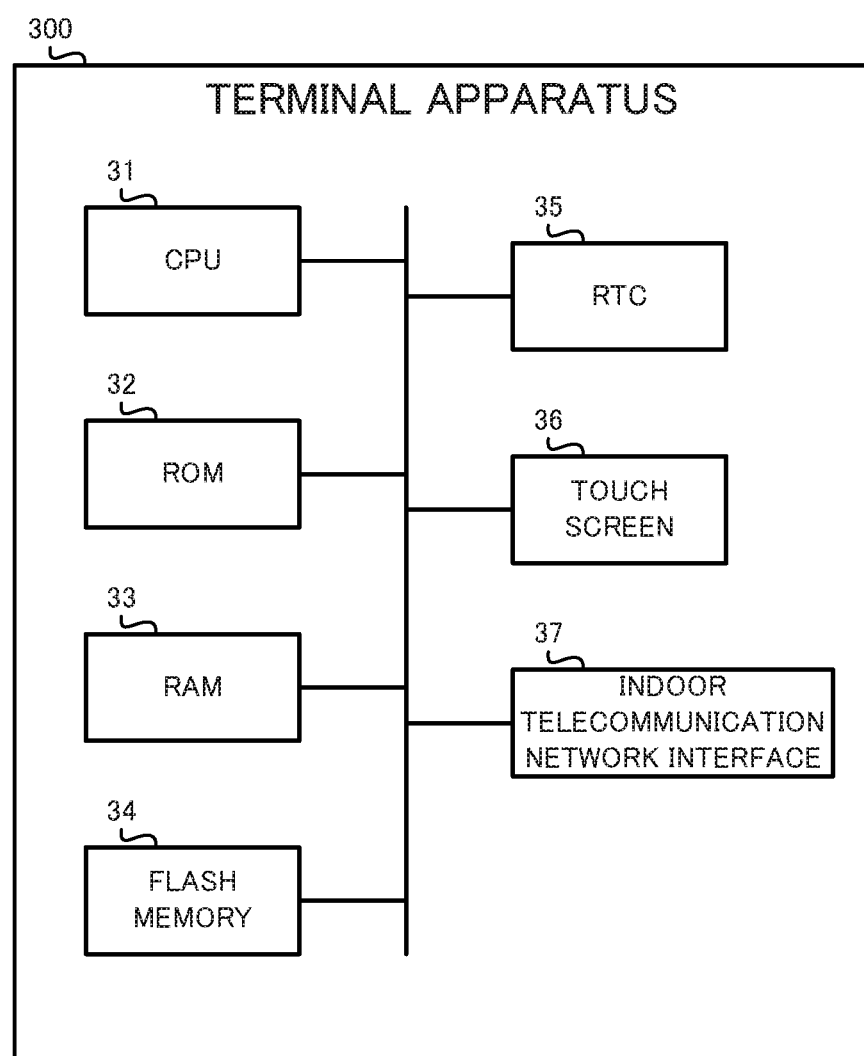
FIG. 4 is a block diagram showing the configuration of the terminal apparatus according to Embodiment 1 of the present disclosure.

The physical configuration of the terminal apparatus 300 is described next with reference to FIG. 4. As shown in FIG. 4, the terminal apparatus 300 includes a CPU 31 controlling the entire operation of the terminal apparatus 300, a ROM 32 storing programs executed by the CPU 31 and the like, a RAM 33 functioning as the work area of the CPU 31, a flash memory 34 for storing various kinds of information, an RTC 35 that is a device for measuring the time, a touch screen 36 functioning as the user interface of the terminal apparatus 300, and an indoor telecommunication network interface 37 for connecting the terminal apparatus 300 to the indoor telecommunication network 400. The components of the terminal apparatus 300 are interconnected via a bus. The terminal apparatus 300 has basically the same configuration as the control apparatus 100 and thus explanation thereof is omitted.

Figure 5:
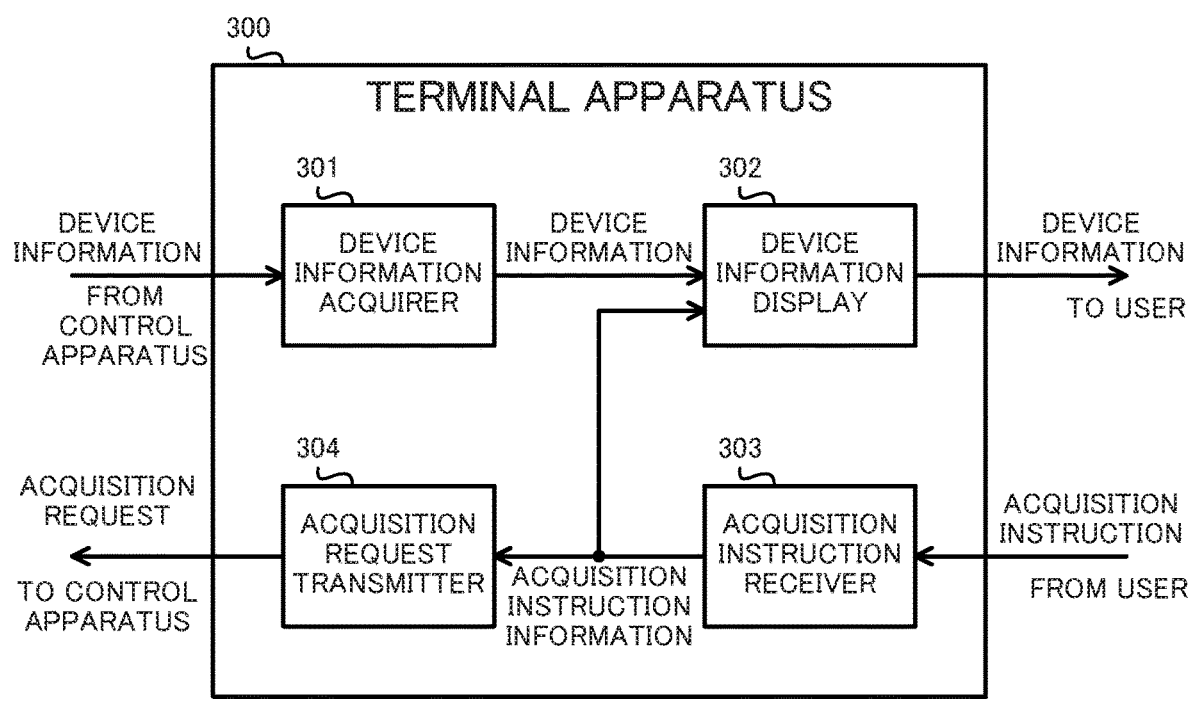
FIG. 5 is a diagram for explaining the function of the terminal apparatus according to Embodiment 1 of the present disclosure.

The basic function of the terminal apparatus 300 is described next with reference to FIG. 5. The terminal apparatus 300 functionally includes a device information acquirer 301 for acquiring device information, a device information display 302 for displaying the device information, an acquisition instruction receiver 303 for receiving an acquisition instruction, and an acquisition request transmitter 304 for transmitting an acquisition request.

The device information acquirer 301 acquires device information of each electrical device from the control apparatus 100. Here, the control apparatus 100 collects from the electrical devices device state information presenting the device state of an electrical device. Moreover, the control apparatus 100 stores device information of each electrical device including information presenting an identifier identifying the electrical device, an expected installation location that is expected to be the location where the electrical device is installed, and the collected device state information. For example, the control apparatus 100 stores the device information of each electrical device in the flash memory 14. The device information acquirer 301 includes, for example, the CPU 31 and indoor telecommunication network interface 37.

The device information display 302 associates and displays on a screen the identifier, expected installation location, and device state for each electrical device based on the device information of each electrical device acquired by the device information acquirer 301. The device information display 302 includes, for example, the CPU 31 and touch screen 36.

Here, the device information acquirer 301 acquires from the control apparatus 100 device state information of an electrical device of interest, which is the electrical device identified with an identifier that the user is interested in, the device state information being newly collected by the control apparatus 100 after the operation target electrical device is operated by the user. Here, the operation target electrical device is an electrical device installed at an expected installation location displayed on the screen in association with an identifier the user is interested in among the identifiers displayed on the screen by the device information display 302.

Here, for example, if there are no electrical devices of the same kind in one room (at one installation location), the electrical device of interest is presumably the operation target electrical device provided that the expected installation location of the electrical device of interest is correct. On the other hand, even if there are no electrical devices of the same kind in one room (at one installation location), an electrical device other than the electrical device of interest may be the operation target electrical device when the expected installation location of the electrical device of interest is wrong.

Here, based on the device state information of the electrical device of interest acquired by the device information acquirer 301, the device information acquirer 301 explicitly shows on the screen whether the device state of the electrical device of interest has changed due to the operation by the user. The method of clearly showing whether the device state of the electrical device of interest has changed can be adjusted as appropriate. For example, the device state of the electrical device of interest may simply be updated on the screen or the fields on the screen in which information regarding the electrical device of interest is displayed may be highlighted.

After the operation by the user, the acquisition instruction receiver 303 receives an instruction to acquire the device state information of the electrical device of interest. The acquisition instruction is enabled, for example, by a button to be pressed by the user. The acquisition instruction receiver 303 includes, for example, the CPU 31 and touch screen 36.

In response to the acquisition instruction receiver 303 receiving the acquisition instruction, the acquisition request transmitter 304 sends to the control apparatus 100 a request to acquire the device state information of the electrical device of interest. The acquisition request is a request for the control apparatus 100 to send a command to request the device state information to the electrical device of interest and receive the device state information from the electrical device of interest. The acquisition request transmitter 304 includes, for example, the CPU 31 and indoor telecommunication network interface 37.

Here, the device information acquirer 301 acquires from the control apparatus 100 the device state information newly collected from the electrical device of interest by the control apparatus 100 in response to the acquisition request sent from the acquisition request transmitter 304.

Then, in the fields on the screen where the device information of the electrical device of interest is displayed, the device information display 302 explicitly shows whether the device state of the electrical device of interest has changed before versus after the receiving of the acquisition instruction by the acquisition instruction receiver 303.

Moreover, the acquisition instruction receiver 303 may receive an instruction to acquire the device state information of the electrical devices after the operation by the user.

In such a case, in response to reception of the acquisition instruction by the acquisition instruction receiver 303, the acquisition request transmitter 304 sends to the control apparatus 100 a request to acquire the device state information of the electrical devices.

On the other hand, the device information acquirer 301 acquires from the control apparatus 100 the device state information newly collected from the electrical devices by the control apparatus 100 in response to the acquisition request sent from the acquisition request transmitter 304.

Then, the device information display 302 explicitly shows the fields on the screen in which the device information is displayed of an electrical device for which the device state after the reception of the acquisition instruction by the acquisition instruction receiver 303 has changed relative to before reception of the acquisition instruction.

An installation location check screen on which update buttons are displayed is described next with reference to FIG. 6.

As shown in FIG. 6, an identifier (the name of an electrical device), an installation location (an expected installation location), a device state, and an update button are associated and displayed for each electrical device on a screen 600 that is an installation location check screen. Here, the identifier is displayed in a field 601, the installation location is displayed in a field 602, and the device state is displayed in a field 603. Here, the identifier, installation location, and device state are all indicated by the device information that the terminal apparatus 300 acquires from the control apparatus 100. In other words, the control apparatus 100 retains the device information of each electrical device. Here, the control apparatus 100 updates the device state information in the retained device information as appropriate based on the device state information acquired from the electrical devices.

FIG. 6 shows a case in which the electrical device 210 (air conditioner 1) is installed in the living room and is not running, the electrical device 220 (air conditioner 2) is installed in the study and is not running, and the electrical device 230 (air conditioner 3) is installed in the bedroom and is not running.

Moreover, buttons 604 are displayed next to the fields 603. The buttons 604 are each an individual update button for receiving an instruction to update the device state of the electrical device corresponding to the button 604.

Moreover, a button 605 is displayed on the screen 600. The button 605 is a collective update button for receiving an instruction to update the device states of all electrical devices.

An installation location check screen after an individual update button is pressed is described next with reference to FIG. 7.

Firstly, the installation location check screen shown in FIG. 6 is assumed to be displayed, and the user is assumed to check whether the installation location of an electrical device the user is interested in ("an electrical device of interest" as appropriate hereafter) is correctly registered. Here, the electrical device of interest is assumed to be the electrical device 230, that is, air conditioner 3. In such a case, the user moves to the bedroom where the electrical device 230 is expected to be installed and operates the electrical device installed in the bedroom directly, or using a dedicated remote control, so as to change the device state. For example, the user operates a button of the electrical device installed in the bedroom so that the device state of the electrical device installed in the bedroom changes from "not running" to "cooling". Subsequently, the user presses the button 604, displayed on the screen 600, that is associated with the electrical device of interest (an individual update button). Upon pressing of the button 604, the screen 600 shown in FIG. 6 is updated to a screen 610 shown in FIG. 7.

The screen 610 shows that the electrical device operated by the user is the electrical device of interest. In other words, the screen 610 shows that the electrical device 230, recognized by the control apparatus 100 as the device installed in the bedroom, is actually installed in the bedroom. As just described, the screen 610 shows that the installation location of the electrical device of interest registered in the control apparatus 100 is correct.

Here, the method of explicitly showing that the installation location is correct can be appropriately adjusted. For example, as shown in FIG. 7, the field showing the device state of the electrical device of interest can be displayed in a different mode (for example, in color) in comparison to the fields showing the device states of the other electrical devices. Here, as long as the device state of the electrical device of interest is updated on the screen 610, permissibly no mode, such as color, changes. This configuration enables the user to know whether the set installation location is correct based on whether the device state of the electrical device of interest changes.

On the other hand, if the installation location of the electrical device of interest is not correct, the screen 600 shown in FIG. 6 is maintained even after pressing of the button 604. This is because, for example, if the installation location of the electrical device 230 is wrongly set as the living room, the user operates another electrical device in the living room (for example, the electrical device 210) and the device state of the electrical device 230 does not change. Here, upon individual updating of the device state, the updated device state is not reflected in the screen display when the device state of another operated electrical device changes.

Figure 8:
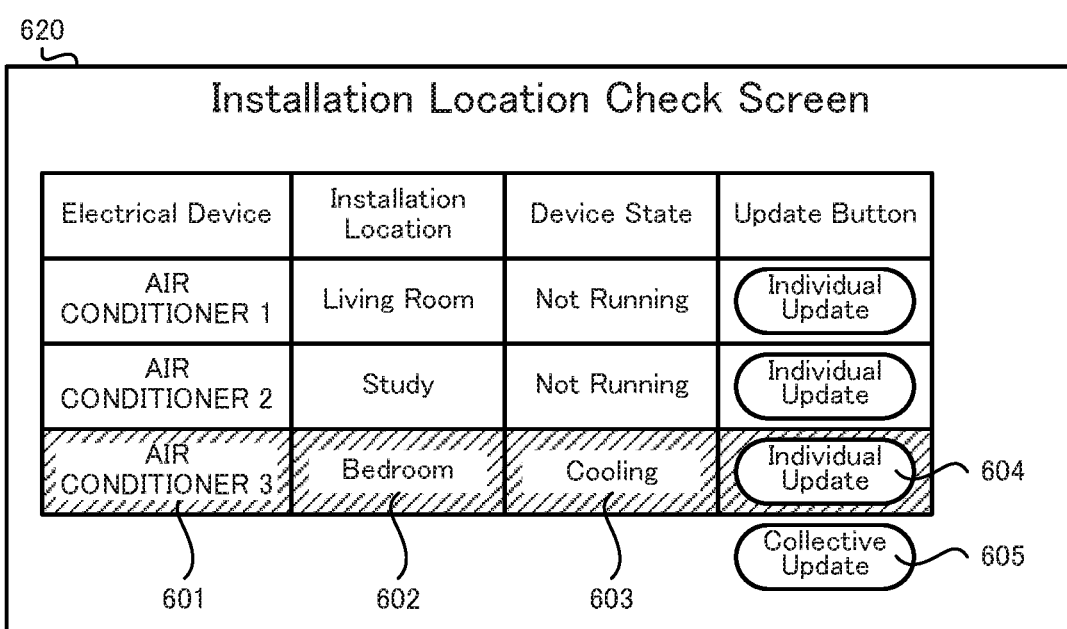
FIG. 8 is an illustration showing an installation location check screen after the collective update button is pressed.

An installation location check screen after the collective update button is pressed is described next with reference to FIG. 8.

Here, basically the same assumptions as described above are made except that the user is assumed to press the collective update button instead of the individual update button. Therefore, the electrical device of interest is the electrical device 230. First, the user operates a button of the electrical device that is installed in the bedroom and that is expected to be the electrical device 230. Subsequently, the user presses the button 605, that is, collective update button, displayed on the screen 600. Due to pressing-operating of the button 605, the screen 600 shown in FIG. 6 is updated to a screen 620 shown in FIG. 8.

The screen 620 shows that the electrical device operated by the user is the electrical device of interest. In other words, the screen 620 shows that the electrical device 230 that the control apparatus 100 recognizes as the device installed in the bedroom is actually installed in the bedroom. As just described, the screen 620 shows that the installation location of the electrical device of interest that is set in the control apparatus 100 is correct.

Here, the method of explicitly showing that the installation location is correct can be appropriately modified. For example, as shown in FIG. 8, the fields showing information regarding the electrical device for which the device state has changed can be displayed in a different mode (for example, in color) in comparison to the fields showing the device states of the other electrical devices. Here, as long as the device state is updated, on the screen 620, for the electrical device that has a changed device state, permissibly no mode, such as color, changes. Such a configuration is permissible because, even in such a case, the user can know whether the registered installation location is correct, based on whether device state is changed for which electrical device.

Here, when the device states are collectively updated, because there is a changed device state of another operated electrical device, the updated device state of the other electrical device is indicated in the screen display. For example, if the installation location of the electrical device 230 is wrongly registered as the living room, the user operates another electrical device in the living room (for example, the electrical device 210) and the device state of the electrical device 210 changes, which is indicated in the screen display.

Figure 9:
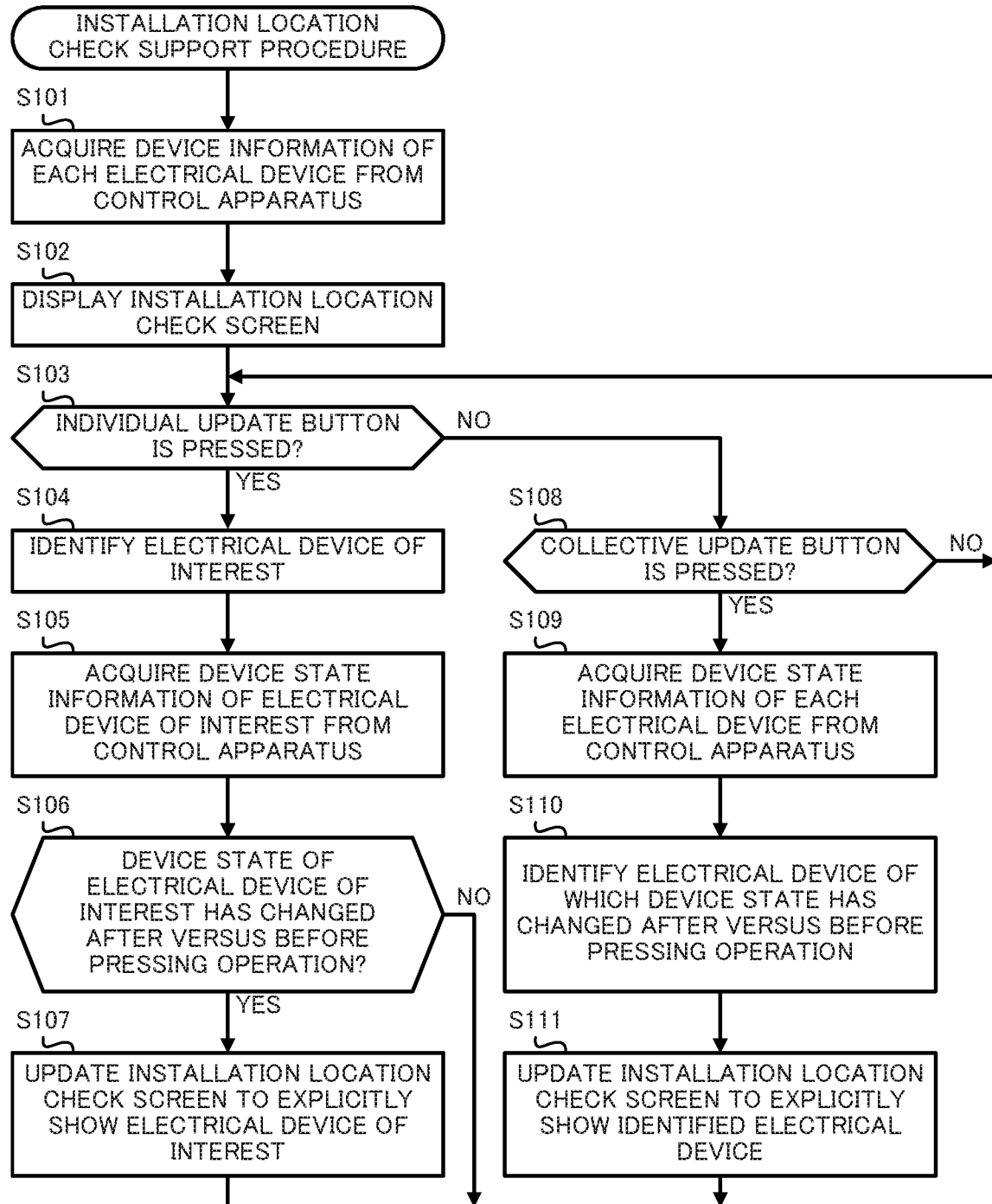
FIG. 9 is a flowchart showing the installation location check support procedure executed by the terminal apparatus according to Embodiment 1 of the present disclosure.

The installation location check support procedure executed by the terminal apparatus 300 is described next with reference to the flowchart shown in FIG. 9. Here, the terminal apparatus 300 starts the installation location check support procedure shown in FIG. 9, for example, in response to receiving, by the touch screen 36, of an instruction to start the installation location check support procedure.

First, the CPU 31 acquires the device information of the electrical devices from the control apparatus 100 (step S101). For example, the CPU 31 controls the indoor telecommunication network interface 37 to send to the control apparatus 100 an instruction to acquire the device information of the electrical devices. On the other hand, the control apparatus 100 sends the device information of each electrical device stored in the flash memory 14 to the terminal apparatus 300. Here, it is assumed in this embodiment that the control apparatus 100 does not update the device information, particularly the device state information, stored in the flash memory 14 unless the terminal apparatus 300 instructs an update. Then the CPU 31 acquires the device information of each electrical device sent from the control apparatus 100 via the indoor telecommunication network interface 37. The CPU 31 stores the acquired device information of each electrical device in the flash memory 34.

After completing the processing of step S101, the CPU 31 displays an installation location check screen (step S102). More specifically, first, the CPU 31 identifies the identifier, installation location, and device state of each electrical device based on the acquired device information of each electrical device. Then the CPU 31 supplies to the touch screen 36 image signals for displaying an installation location check screen presenting the identified contents, for example, the screen 600. On the other hand, the touch screen 36 displays an installation location check screen according to the image signals supplied from the CPU 31.

After completing the processing of step S102, the CPU 31 determines whether an individual update button is pressed (step S103). More specifically, for example, the CPU 31 determines whether a touch operation on a button 604 is received by the touch screen 36. Here, the user presses an individual update button on the installation location check screen after operating the electrical device installed at the installation location displayed as the installation location of an electrical device of interest.

When an individual updated button is pressed (step S103; YES), the CPU 31 identifies the electrical device of interest, that is to say, the electrical device targeted for the acquiring of the device state information (step S104). For example, the CPU 31 identifies the electrical device corresponding to the pressed button 604 as the electrical device of interest.

After completing the processing of step S104, the CPU 31 acquires the device state information of the electrical device of interest from the control apparatus 100 (step S105). For example, the CPU 31 controls the indoor telecommunication network interface 37 to send an instruction to acquire the device state information of the electrical device of interest to the control apparatus 100. On the other hand, in response to receiving the acquisition instruction from the terminal apparatus 300, the control apparatus 100 sends to the electrical device of interest an instruction to request the device state information. On the other hand, in response to receiving the instruction from the control apparatus 100, the electrical device of interest sends the device state information to the control apparatus 100.

Here, the control apparatus 100 updates the device information of the electrical device of interest stored in the flash memory 14 based on the device state information received from the electrical device of interest. Moreover, the control apparatus 100 sends the device state information received from the electrical device of interest to the terminal apparatus 300. On the other hand, the CPU 31 acquires the device state information sent from the control apparatus 100 via the indoor telecommunication network interface 37. The CPU 31 stores the acquired device state information of the electrical device of interest in the flash memory 34.

After completing the processing of step S105, the CPU 31 determines whether the device state of the electrical device of interest after the pressing operation is changed relative to before the pressing operation (step S106). For example, the CPU 31 determines whether the device state information of the electrical device of interest stored in the flash memory 34 for before the pressing operation matches the device state information the electrical device of interest stored in the flash memory 34 for after the pressing operation of. Here, the device state information before the pressing operation of the electrical device of interest is contained, for example, in the device information of each electrical device acquired in step S101, or updated device information of each electrical device described later. Here, the CPU 31 can update the device information of each electrical device stored in the flash memory 34 with the device state information of the electrical device of interest acquired in step S105.

If the device state of the electrical device of interest after the pressing operation is changed relative to before the pressing operation (step S106; YES), the CPU 31 updates the installation location check screen to explicitly show the electrical device of interest (step S107). More specifically, first, the CPU 31 updates the device state of the electrical device of interest to a new device state on the installation location check screen before change of the device state of the electrical device of interest (for example, the screen 600) and then changes the display mode to clarify the electrical device of interest. Then, the CPU 31 supplies to the touch screen 36 image signals for displaying a changed installation location check screen, for example, as the screen 610. On the other hand, the touch screen 36 displays the installation location check screen according to the image signals supplied from the CPU 31.

On the other hand, if no individual update button is pressed (step S103; NO), the CPU 31 determines whether the collective update button is pressed (step S108). More specifically, for example, the CPU 31 determines whether a touch operation on the button 605 is received by the touch screen 36. Here, the user presses the collective update button on the installation location check screen after operating the electrical device installed at the installation location displayed as the installation location of an electrical device of interest.

If the collective update button is pressed (step S108; YES), the CPU 31 acquires the device state information of each electrical device from the control apparatus 100 (step S109). For example, the CPU 31 controls the indoor telecommunication network interface 37 to send to the control apparatus 100 an instruction to acquire the device state information of each electrical device. On the other hand, in response to receiving the acquisition instruction from the terminal apparatus 300, the control apparatus 100 sends to the electrical devices a command to request the device state information. On the other hand, in response to receiving the command from the control apparatus 100, the electrical devices send the device state information thereof to the control apparatus 100.

Here, based on the device state information received from the electrical devices, the control apparatus 100 updates the device information of each electrical device stored in the flash memory 14. Moreover, the control apparatus 100 sends the device state information received from the electrical devices to the terminal apparatus 300. On the other hand, the CPU 31 acquires the device state information of each electrical device sent from the control apparatus 100 via the indoor telecommunication network interface 37. The CPU 31 stores the acquired device state information of each electrical device in the flash memory 34.

After completing the processing of step S109, the CPU 31 identifies an electrical device for which the device state has changed after the pressing operation relative to before the pressing operation (step S110). For example, the CPU 31 determines for each electrical device whether the device state information before the pressing operation stored in the flash memory 34 matches the device state information after the pressing operation stored in the flash memory 34. Here, the device state information before the pressing operation of each electrical device is contained, for example, in the device information of each electrical device acquired in the step S101, or updated device information of each electrical device described later. Here, the CPU 31 can update the device information of each electrical device stored in the flash memory 34 using the device state information of each electrical device acquired in the step S109 after the above identification.

After completing the processing of step S110, the CPU 31 updates the installation location check screen to explicitly show the identified electrical device (step S111). More specifically, first, the CPU 31 updates the device state of the identified electrical device to a new device state in the installation location check screen before change of the device state of the identified electrical device (for example, the screen 600) and changes the display mode to clarify the identified electrical device. Then, the CPU 31 supplies to the touch screen 36 image signals for displaying a changed installation location check screen (for example, the screen 620). On the other hand, the touch screen 36 displays the installation location check screen according to the image signals supplied from the CPU 31.

The CPU 31 returns processing to the step S103 if the device state of the electrical device of interest, relative to prior to the pressing operation, is not changed after the pressing operation (step S106; NO), after completing the processing of the step S107, or if the collective update button is not pressed (step S108: NO) and then after completing the processing of the step S111.

According to this embodiment, the screen explicitly shows whether the device state of an electrical device of interest is changed due to an operation of the user on an operation target electrical device expected to be the electrical device of interest. More specifically, according to this embodiment, whether the device state of an electrical device of interest has changed due to an operation by the user is explicitly shown on the screen based on the device state information of the electrical device of interest newly collected by the control apparatus after operation by the user of an electrical device installed in the expected installation location of the electrical device of interest. Therefore, according to this embodiment, whether the installation location of an electrical device of interest is correctly set can be explicitly indicated to the user.

Moreover, according to this embodiment, whether the device state of an electrical device of interest is changed after an instruction to acquire the device state information of the electrical device of interest relative to before the instruction to acquire the device information is explicitly shown in the fields in the screen in which the device information of the electrical device of interest is displayed. Therefore, according to this embodiment, the user can be explicitly shown whether the installation location of an electrical device of interest is correctly set. Moreover, according to this embodiment, the only acquired device state information is that of the electrical device of interest, thereby enabling rapid checking of the installation location while using a low amount of communication traffic.

Moreover, according to this embodiment, the screen clearly shows the fields of the device information of an electrical device for which the device state after an instruction to acquire the device state information of the electrical devices changes relative to before the instruction. Therefore, according to this embodiment, when the installation location of the electrical device of interest is not correctly set, the user can be explicitly shown the installation location for which the electrical device is mistaken to be the electrical device of interest.

Modified Embodiment of Embodiment 1

In Embodiment 1, an example is described in which the device state information is acquired in response to the user pressing an update button that is an individual update button or the collective update button. In the present disclosure, the device state information may be acquired automatically and periodically.

In such a case, the device information acquirer 301 periodically acquires from the control apparatus 100 the device state information the control apparatus 100 periodically collects from the electrical devices. The device information acquirer 301 includes, for example, the CPU 31, RTC 35, and indoor telecommunication network interface 37.

Then, the device information display 302 explicitly shows on a screen the fields in which there is display of the device information of an electrical device for which the device state indicated by the device state information periodically acquired by the device information acquirer 301 has changed. Here, the screen can be, for example, a screen excluding the buttons 604 and button 605 from the installation location check screen shown in FIG. 8, that is, the screen 620.

Figure 10:
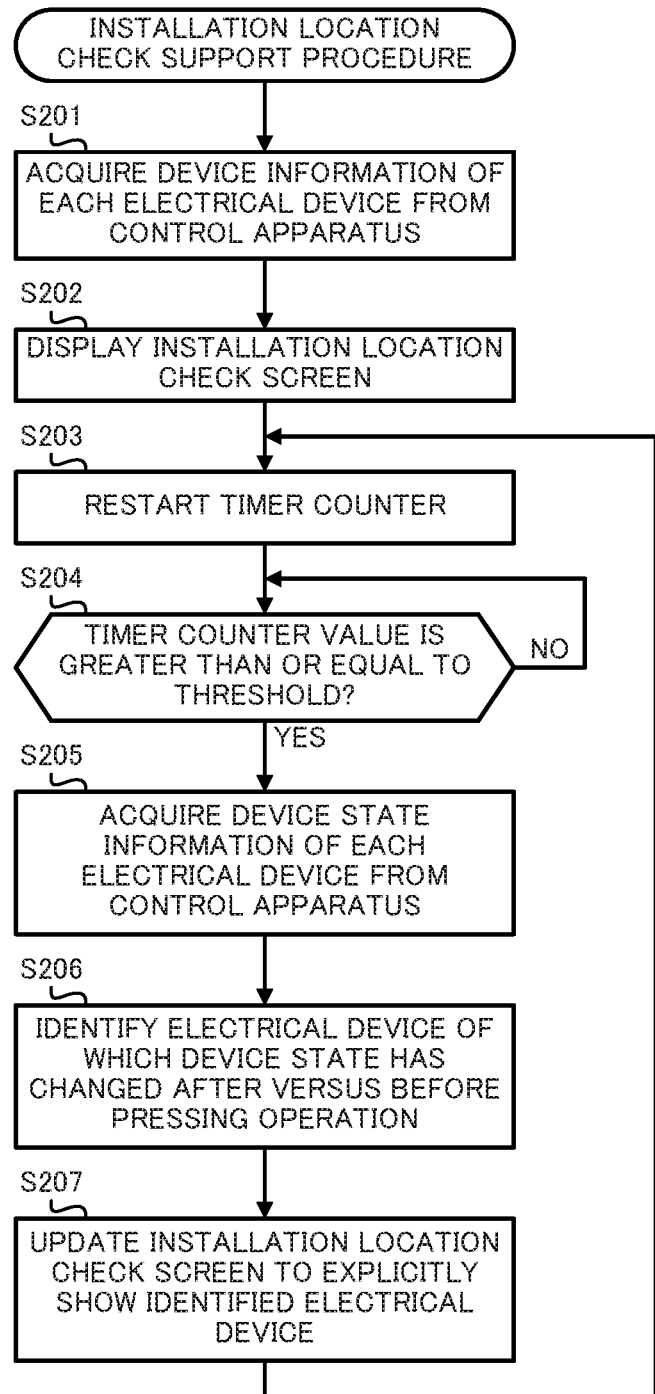
FIG. 10 is a flowchart showing the installation location check support procedure executed by the terminal apparatus according to a modified version of Embodiment 1 of the present disclosure.

The installation location check support procedure executed by the terminal apparatus 300 according to the modified embodiment is described next with reference to the flowchart shown in FIG. 10. Here, the terminal apparatus 300 starts the installation location check support procedure shown in FIG. 10, for example, in response to the touch screen 36 receiving an instruction to start the installation location check support procedure.

First, the CPU 31 acquires the device information of each electrical device from the control apparatus 100 (step S201). The CPU 31 stores the acquired device information of each electrical device in the flash memory 34.

After completing the processing of step S201, the CPU 31 displays an installation location check screen (step S202). For example, the CPU 31 controls the touch screen 36 to displays a screen excluding the buttons 604 and button 605 from the installation location check screen shown in FIG. 6, that is, the screen 600.

After completing the processing of step S202, the CPU 31 restarts a timer counter (step S203). More specifically, the CPU 31 clears and sets to zero a timer counter configured by the RTC 35 and starts count-up of the timer counter.

After completing the processing of step S203, the CPU 31 determines whether the value of the timer counter is greater than or equal to a threshold (step S204). More specifically, for example, the CPU 31 determines whether the value of the timer counter configured by the RTC 35 is greater than or equal to a predetermined threshold. If the value of the timer counter is not greater than or equal to the threshold (step S204; NO), processing by the CPU 31 returns to step S204.

On the other hand, if the value of the timer counter is greater than or equal to the threshold (step S204; YES), the CPU 31 acquires the device state information of each electrical device from the control apparatus 100 (step S205). The CPU 31 stores the acquired device state information of each electrical device in the flash memory 34.

After completing the processing of step S205, the CPU 31 identifies an electrical device for which the device state after the pressing operation is changed relative to before the pressing operation (step S206). The CPU 31 can update the device information of each electrical device stored in the flash memory 34 with the device state information of each electrical device acquired in step S205 after the above identification.

After completing the processing of step S206, the CPU 31 updates the installation location check screen to explicitly show the identified electrical device (step S207). More specifically, the CPU 31 controls the touch screen 36 to display a screen excluding the buttons 604 and button 605 from the installation location check screen shown in FIG. 8, that is, the screen 620.

After completing the processing of step S207, processing by the CPU 31 returns to step S203.

According to this embodiment, a screen automatically and periodically clearly shows the fields of the device information of an electrical device for which the device state has changed. Therefore, according to this embodiment, when the installation location of the electrical device of interest is not correctly set, in an easy-to-understand manner requiring less time and effort of the user, the user can be explicitly shown the installation location at which the electrical device is mistaken to be the electrical device of interest.

Embodiment 2

In Embodiment 1, an example is described in which the terminal apparatus 300 displays a screen explicitly showing whether the installation location of an electrical device is proper after the user operates an electrical device. In the present disclosure, the method of supporting the user in checking the installation location of an electrical device is not restricted to the above example. For example, in the present disclosure, a control command causing an obvious device state change may be sent to an electrical device when the user requests checking of the installation location of an electrical device by a terminal apparatus 310. The following explanation is basically a description of the differences between the terminal apparatus 310 according to Embodiment 2 and the terminal apparatus 300 according to Embodiment 1. Moreover, the terminal apparatus 310 according to Embodiment 2 has the same physical configuration as the terminal apparatus 300 according to Embodiment 1.

Figure 11:
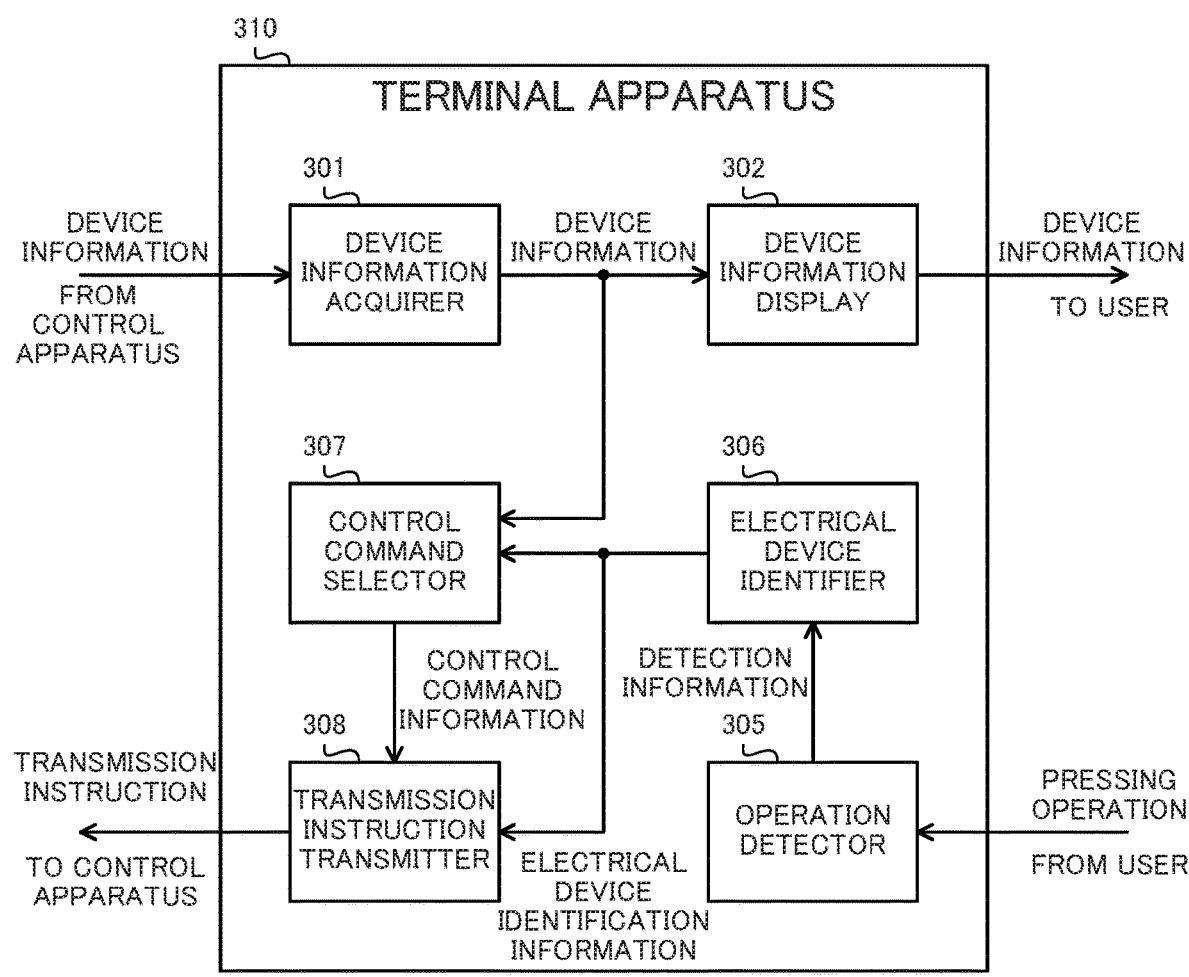
FIG. 11 is a diagram for explaining functions of the terminal apparatus according to Embodiment 2 of the present disclosure.

First, the basic function of the terminal apparatus 310 is described with reference to FIG. 11. The terminal apparatus 310 functionally includes a device information acquirer 301 for acquiring device information, a device information display 302 for displaying the device information, an operation detector 305 for detecting a pressing operation, an electrical device identifier 306 for identifying an electrical device, a control command selector 307 for selecting a control command, and a transmission instruction transmitter 308 for transmitting a transmission instruction.

The device information acquirer 301 acquires the device information of each electrical device from the control apparatus 100. Here, the control apparatus 100 uses control commands to control the electrical devices. Moreover, the control apparatus 100 stores the device information of each electrical device including information presenting an identifier identifying the electrical device, information presenting an expected installation location that is expected to be the location where the electrical device is installed, and control command information presenting control commands. The device information acquirer 301 includes, for example, the CPU 31 and indoor telecommunication network interface 37.

The device information display 302 associates and displays on a screen the identifier, the expected installation location, and an installation location check instruction button for each electrical device based on the device information of each electrical device acquired by the device information acquirer 301. The device information display 302 includes, for example, the CPU 31 and touch screen 36.

The operation detector 305 detects a pressing operation on an installation location check instruction button displayed on the screen for each electrical device by the device information display 302. The operation detector 305 includes, for example, the CPU 31 and touch screen 36.

The electrical device identifier 306 identifies an electrical device identified with an identifier displayed on the screen in association with the installation location check instruction button on which a pressing operation is detected by the operation detector 305. The electrical device identifier 306 includes, for example, the CPU 31.

Among control commands to the electrical device identified by the electrical device identifier 306 based on the device information of each electrical device acquired by the device information acquirer 301, the control command selector 307 selects a control command causing a visually or audibly obvious device state change. The control command selector 307 includes, for example, the CPU 31.

The transmission instruction transmitter 308 sends to the control apparatus 100 an instruction to transmit the control command selected by the control command selector 307 to the electrical device identified by the electrical device identifier 306. The transmission instruction transmitter 308 includes, for example, the CPU 31 and indoor telecommunication network interface 37.

An installation location check screen on which installation location check buttons are displayed is described next with reference to FIG. 12.

Figure 12:
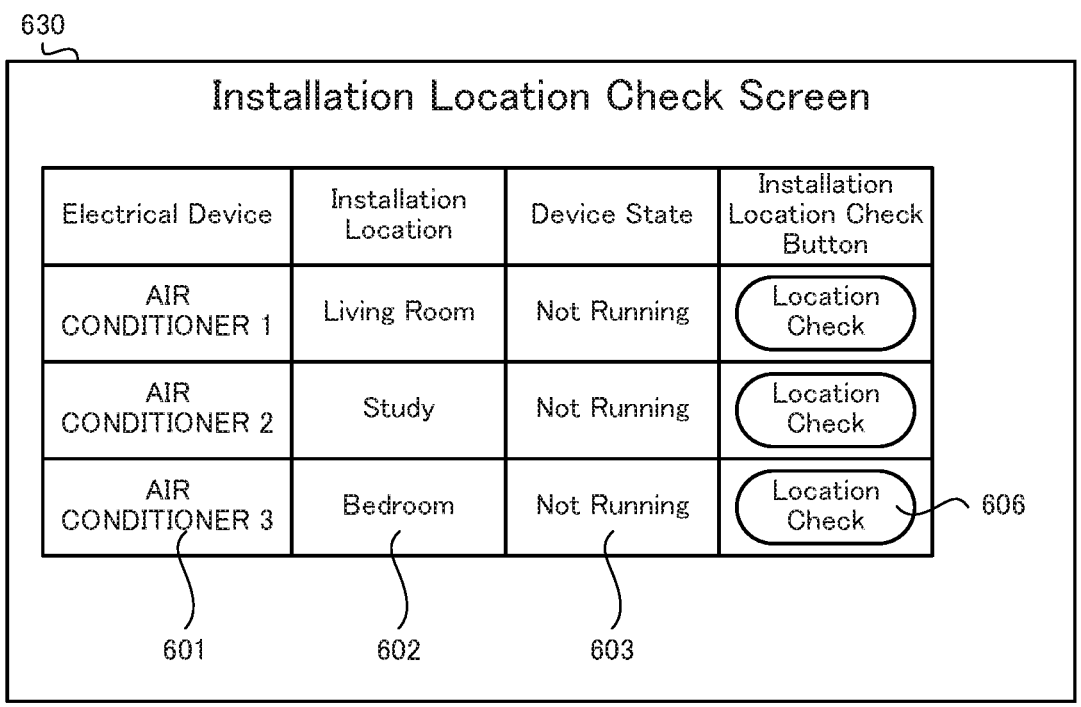
FIG. 12 is an illustration showing an installation location check screen on which installation location check buttons are displayed.

As shown in FIG. 12, an identifier (the name of an electrical device), an installation location (an expected installation location), a device state, and an installation location check button are associated and displayed for each electrical device on a screen 630 that is an installation location check screen. Here, the identifier is displayed in a field 601, the installation location is displayed in a field 602, and the device state is displayed in a field 603. Here, all of the identifier, installation location, and device state are presented by the device information the terminal apparatus 300 based on acquisition from the control apparatus 100. Here, the device information the terminal apparatus 300 acquired from the control apparatus 100 includes control command information presenting control commands to the electrical device.

Moreover, buttons 606 are displayed next to the fields 603. The button 606 is an installation location check button receiving an instruction to check the installation location of the electrical device corresponding to the button 606.

Here, upon display of the installation location check screen shown in FIG. 12, the user is assumed to check whether the installation location of an electrical device of interest is correctly registered. Here, the electrical device of interest is assumed to be the electrical device 230 (air conditioner 3). In such a case, the user moves to the bedroom that is expected to be the location where the electrical device 230 is installed and presses the button 606 (an installation location check button) associated with the electrical device 230.

On the other hand, in response to pressing of the button 606, the terminal apparatus 310 identifies an electrical device associated with the button 606 (an electrical device of interest). Then, among control commands to the identified electrical device based on the device information acquired from the control apparatus 100, the terminal apparatus 310 selects a control command causing a visually or audibly obvious device state change. Then, the terminal apparatus 310 sends to the control apparatus 100 an instruction to transmit the selected control command to the identified electrical device.

The selected control command is preferably a control command for causing a device state change the user can easily recognize, such as a control command to turn on a light emitting element of the electrical device, a control command to make the electrical device beep, or a control command to greatly change the shape of the electrical device.

Here, in response to receiving the transmission instruction from the terminal apparatus 310, the control apparatus 100 sends the selected control command to the identified electrical device. On the other hand, in response to receiving the control command from the control apparatus 100, the identified electrical device executes an operation corresponding to the control command and causes a change in the device state. Then, based on whether there is a change in the state of the electrical device that can be checked from the location of the user, the user can determine whether the installation location set for the electrical device of interest is correct. More specifically, when there is a change in the state of the electrical device that can be checked from the location of the user, the user determines that the installation location set for the electrical device of interest is correct. On the other hand, when there is no change in the state of the electrical device that can be checked from the location of the user, the user determines that the installation location set for the electrical device of interest is not correct.

Figure 13:
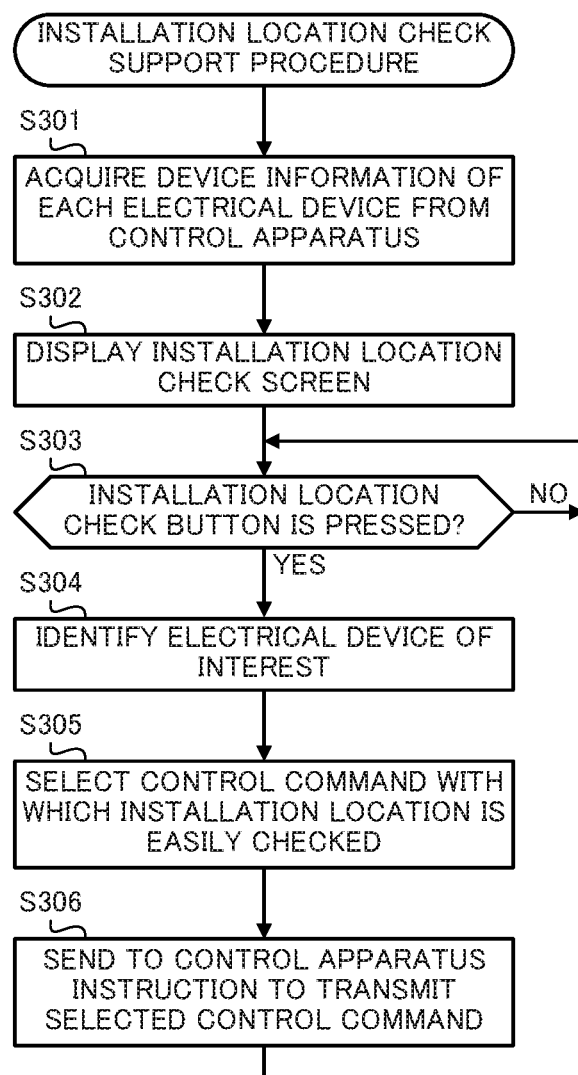
FIG. 13 is a flowchart showing the installation location check support procedure executed by the terminal apparatus according to Embodiment 2 of the present disclosure.

The installation location check support procedure executed by the terminal apparatus 310 is described next with reference to the flowchart shown in FIG. 13. Here, the terminal apparatus 310 starts the installation location check support procedure shown in FIG. 13, for example, in response to the touch screen 36 receiving an instruction to start the installation location check support procedure.

First, the CPU 31 acquires the device information of each electrical device from the control apparatus 100 (step S301). The CPU 31 stores the acquired device information of each electrical device in the flash memory 34.

After completing the processing of step S301, the CPU 31 displays an installation location check screen (step S302). For example, the CPU 31 controls the touch screen 36 to display the installation location check screen shown in FIG. 12, that is, the screen 630.

After completing the processing of step S302, the CPU 31 determines whether an installation location check button is pressed (step S303). More specifically, for example, the CPU 31 determines whether a touch operation on a button 606 is received by the touch screen 36. Here, the user presses an installation location check button on the installation location check screen after moving to a place from which the user can recognize a change in the device state of the electrical device installed at the installation location displayed as the installation location of the electrical device of interest.

If an installation location check button is pressed (step S303; YES), the CPU 31 identifies an electrical device of interest, that is, an electrical device to check the installation location thereof (step S304). For example, the CPU 31 identifies the electrical device corresponding to the pressed button 606 as the electrical device of interest.

After completing the processing of step S304, the CPU 31 selects a control command for easy checking of the installation location (step S305). More specifically, the CPU 31 identifies the device information of the electrical device of interest in the device information acquired in step S301. Then, the CPU 31 selects a control command for causing a visually or audibly obvious device state change based on the control command information contained in the identified device information.

After completing the processing of step S305, the CPU 31 sends to the control apparatus 100 an instruction to transmit the selected control command (step S306). For example, the CPU 31 controls the indoor telecommunication network interface 37 to send to the control apparatus 100 an instruction to transmit the selected control command. On the other hand, in response to receiving the transmission instruction from the terminal apparatus 300, the control apparatus 100 sends the selected control command to the electrical device of interest. On the other hand, in response to receiving the selected control command from the control apparatus 100, the electrical device of interest executes an operation according to the control command and changes the device state. On the other hand, for the electrical device for which the device state is recognizable from the location of the user, the user can determine whether there is a change in the device state.

If no installation location check button is pressed (step S303; NO), or after completing the processing of the step S306, processing by the CPU 31 returns to step S303.

According to this embodiment, a control command causing a visually or audibly obvious device state change is sent to an electrical device of interest while the user is present at a location where the user can recognize the device state of the electrical device installed at a location expected to be the installation location of the electrical device of interest. Therefore, according to this embodiment, in an easily understood manner, user can be informed as to whether the installation location of the electrical device of interest is correctly set.

Embodiment 3

In Embodiment 1, an example is described in which the user is supported in after-the-fact checking of whether the registered installation location is proper. In the present disclosure, the user may be supported in setting an installation location as correctly as possible. An example is described below in which an installation location of an electrical device is set while pairing the electrical device and control apparatus 100. Here, "pairing" refers to the procedure of setting up an electrical device in the control apparatus 100 to enable intercommunication between the control apparatus 100 and electrical device.

Here, although equipped with a control apparatus 110 in place of the control apparatus 100, the installation location setting support system according to Embodiment 3 is physically configured similarly to that of the installation location check support system 1000 according to Embodiment 1. In other words, the physical configuration of the control apparatus 110 according to Embodiment 3 is similar to that of the control apparatus 100 according to Embodiment 1. The following explanation is basically a description of the differences between the control apparatus 110 according to Embodiment 3 and the control apparatus 100 according to Embodiment 1. In the embodiment described below, the electrical device 210 is taken to be the electrical device for which the installation location is to be set.

Figure 14:
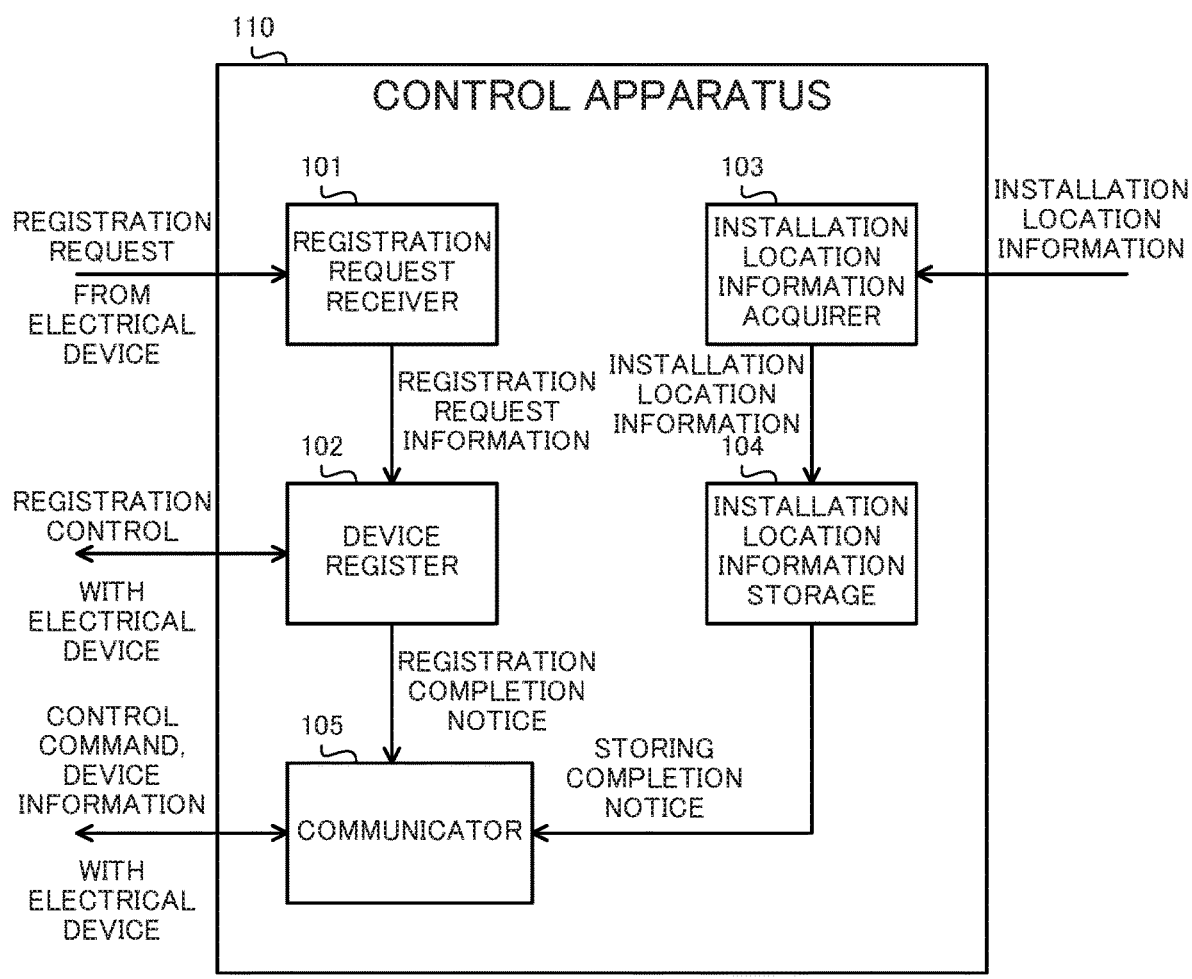
FIG. 14 is an illustration for explaining functions of the control apparatus according to Embodiment 3 of the present disclosure.

First, the basic function of the control apparatus 110 is described with reference to FIG. 14. The control apparatus 110 functionally includes a registration request receiver 101 for receiving a request to register the electrical device 210, a device register 102 for registering the electrical device 210, an installation location information acquirer 103 for acquiring installation location information, an installation location information storage 104 for storing the installation location information, and a communicator 105 for communicating with the electrical device 210.

The registration request receiver 101 receives from the electrical device 210 to be controlled or monitored by the terminal apparatus 300, via the control apparatus 110, a request to register the electrical device 210 in the control apparatus 110. The registration request receiver 101 includes, for example, the indoor telecommunication network interface 17.

In response to reception of the registration request by the registration request receiver 101, the device register 102 registers the electrical device 210 in the control apparatus 110. The device register 102 includes, for example, the CPU 11 and indoor telecommunication network interface 17.

The installation location information acquirer 103 acquires installation location information indicating the location where the electrical device 210 is installed. The installation location information acquirer 103 includes, for example, the touch screen 16 and indoor telecommunication network interface 17.

The installation location information storage 104 stores the installation location information acquired by the installation location information acquirer 103. The installation location information storage 104 includes, for example, the CPU 11 and flash memory 14.

After the electrical device 210 is registered in the control apparatus 110 by the device register 102 and the installation location information is stored in the installation location information storage 104, the communicator 105 receives device information from the electrical device 210 or sends control commands to the electrical device 210. The communicator 105 includes, for example, the CPU 11 and indoor telecommunication network interface 17.

Figure 15:
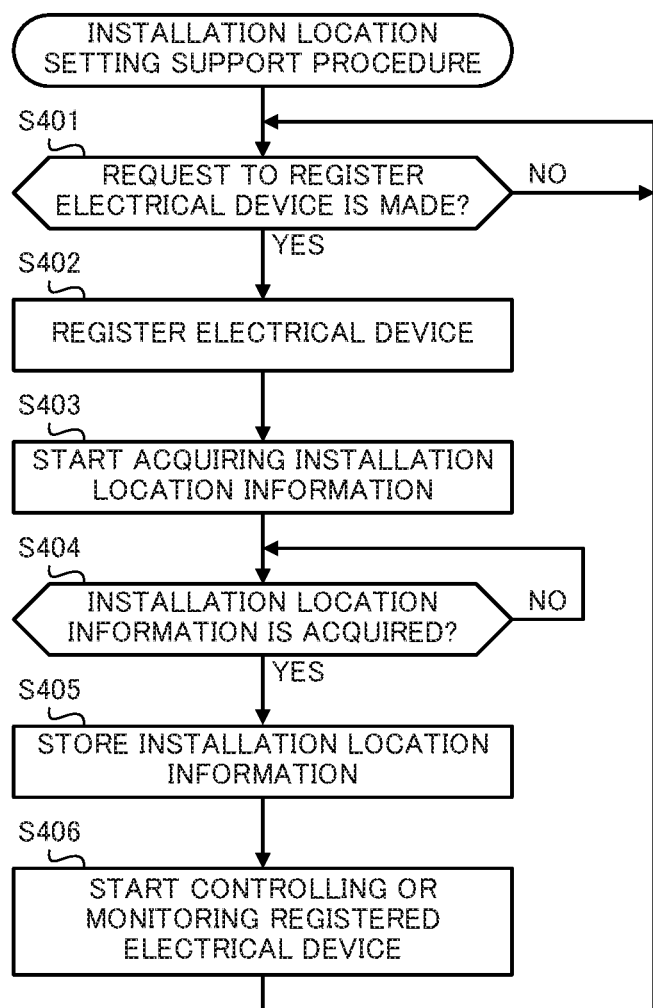
FIG. 15 is a flowchart showing the installation location setting support procedure executed by the control apparatus according to Embodiment 3 of the present disclosure.

The installation location setting support procedure executed by the control apparatus 110 is described next with reference to the flowchart shown in FIG. 15. Here, the control apparatus 110 starts the installation location setting support procedure shown in FIG. 15, for example, in response to being powered on.

First, the CPU 11 determines whether a request to register the electrical device 210 is made (step S401). For example, the CPU 11 determines whether a registration request sent from the electrical device 210 is received by the indoor telecommunication network interface 17. Here, the electrical device 210 can send a registration request to the control apparatus 110, for example, when the electrical device 210 receives a registration request operation from the user or when the electrical device 210 is installed at a location where the electrical device 210 is connectable to the indoor telecommunication network 400. If no request to register the electrical device 210 is made (step S401; NO), processing by the CPU 11 returns to step S401.

On the other hand, if a request to register the electrical device 210 is made (step S401; YES), the CPU 11 registers the electrical device 210 (step S402). More specifically, the CPU 11 conducts paring between the control apparatus 110 and electrical device 210 so that basic communication is available. For example, the CPU 11 sends the MAC address of the control apparatus 110 to the electrical device 210 and receives the MAC address of the electrical device 210 from the electrical device 210. Moreover, the CPU 11 performs actions such as assigning an IP address and assigning an identifier to the electrical device 210.

After completing the processing of step S402, the CPU 11 starts acquiring installation location information (step S403). Here, the method for the CPU 11 to acquire installation location information can be appropriately modified.

For example, the CPU 11 can display a room layout on the touch screen 16. In such a case, the touch screen 16 receives a touch operation specifying an installation location of the electrical device 210 from the user. On the other hand, the CPU 11 can identify the installation location indicated by the touch operation received by the touch screen 16. Here, for registering the electrical device 210 in the control apparatus 110, the user is usually at a place where the electrical device 210 is installed. Therefore, when the user registers the electrical device 210 in the control apparatus 110 and simultaneously sets the installation location of the electrical device 210 in the control apparatus 110, the user is unlikely to set a wrong installation location.

Moreover, for example, the CPU 11 may automatically acquire installation location information from the electrical device 210. More specifically, for example, the CPU 11 sends a request to transmit installation location information to the electrical device 210 via the indoor telecommunication network interface 17. On the other hand, in response to receiving the transmission request, the electrical device 210 sends installation location information to the control apparatus 110. Then, the CPU 11 can acquire the installation location information received by the indoor telecommunication network interface 17. Here, the electrical device 210 can regard, for example, information presented by a DIP switch installed in the electrical device 210 as the installation location information. In such a case, the DIP switch has to be set to a value assigned to the room where the electrical device 210 is installed.

Moreover, the CPU 11 can acquire the installation location information based on information read by a bar code reader. In such a case, the user makes a bar code reader read a tag that is attached to the electrical device 210 and records the MAC address of the electrical device 210. On the other hand, the CPU 11 identifies the installation location of the electrical device 210 based on the MAC address of the electrical device 210 acquired by the bar code reader. In such a case, for example, a table indicating the correspondence between the MAC addresses and installation locations should be stored in the flash memory 14 or the like.

After completing the processing of step S403, the CPU 11 determines whether the installation location information is acquired (step S404). If no installation location information is acquired (step S404; NO), processing by the CPU 11 returns to step S404. In other words, the CPU 11 repeats the determination of step S404 until the installation location information is acquired.

If the installation location information is acquired (step S404; YES), the CPU 11 stores the installation location information (step S405). For example, the CPU 11 associates and stores in the flash memory 14 the acquired installation location information and information indicating the identifier of the electrical device 210.

After completing the processing of step S405, the CPU 11 starts controlling or monitoring the registered electrical device 210 (step S406). From then on, the CPU 11 can control the electrical device 210 by, for example, sending control commands to the electrical device 210. Moreover, the CPU 11 can monitor the electrical device 210 by, for example, sending to the electrical device 210 a command to request acquisition of device information and receiving the device information (or a command containing the device information) sent from the electrical device 210 in response. After completing the processing of the Step S406, processing by the CPU 11 returns to step S401.

According to this embodiment, the installation location of the electrical device 210 is set in the control apparatus 110 when the electrical device 210 is registered in the control apparatus 110. Therefore, according to this embodiment, the possibility of incorrect setting of the installation location of the electrical device 210 can be decreased.

Modified Embodiment

Although embodiments of the present disclosure are described above, various types of modifications or applications can be adopted, according to the implementation.

In the present disclosure, any portions of the configurations, functions, and operations described in the above embodiments can be utilized. Moreover, in the present disclosure, besides the above-described configurations, functions, and operations, additional configurations, functions, and operations may be utilized. Moreover, the configurations, functions, and operations described in the above embodiments can be combined as desired.

For example, a terminal apparatus may execute both the installation location check support procedure executed by the terminal apparatus 300 according to Embodiment 1 and the installation location check support procedure executed by the terminal apparatus 310 according to Embodiment 2. Such a terminal apparatus is expected to be more convenient for the user.

Moreover, for example, at least one of the installation location check support procedure executed by the terminal apparatus 300 according to Embodiment 1 and the installation location check support procedure executed by the terminal apparatus 310 according to Embodiment 2 may be executed after execution of the installation location setting support procedure by the control apparatus 110 according to Embodiment 3. In such a case, a wrong installation location is less likely to be set, and furthermore, a wrong installation location can be expected to be easily found.

In Embodiment 3, an example is described in which the control apparatus 110 is used as an interface, and the electrical device 210 and the installation location of the electrical device 210 are set in the control apparatus 110. In the present disclosure, for example, the electrical device 210 and the installation location of the electrical device 210 may be registered in the control apparatus 110 using the terminal apparatus 300 as a user interface.

By applying operation programs defining the operation of the control apparatus or terminal apparatus according to the present disclosure to the personal computer and the like, an existing personal computer or information terminal apparatus can be enabled to function as the control apparatus or terminal apparatus according to the present disclosure.

The above programs may be distributed by any method and, for example, may be stored and distributed on a non-transitory computer-readable recording medium such as a compact disk read only memory (CD-ROM), digital versatile disk (DVD), magneto-optical disk (MO), and memory card, or distributed via a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is applicable to systems controlling electrical devices using a control apparatus.

The invention claimed is:

1. A control apparatus, comprising:
a receiver configured to receive from an electrical device to be controlled or monitored by a terminal apparatus via the control apparatus a registration instruction to register the electrical device in the control apparatus;
a registrar configured to register the electrical device in the control apparatus in response to receiving of the registration instruction by the receiver;
an acquirer configured to acquire installation location information indicating a location where the electrical device is installed;
a memory configured to store the installation location information acquired by the acquirer; and
a communicator configured to start monitoring of the electrical device or start control of the electrical device after the electrical device is registered in the control apparatus by the registrar and the installation location information is stored in the memory, the monitoring of the electrical device comprising a process of receiving device information from the electrical device and the control of the electrical device comprising a process of sending control commands to the electrical device, and configured to neither start the monitoring of the electrical device nor start the control of the electrical device before the installation location information is stored in the memory.

2. The control apparatus according to claim 1, wherein neither the monitoring of the electrical device nor the control of the electrical device includes a process using the installation location information.

3. An installation location setting support system comprising a terminal apparatus and a control apparatus, wherein the control apparatus comprises:
a receiver configured to receive from an electrical device to be controlled or monitored by the terminal apparatus via the control apparatus a registration instruction to register the electrical device in the control apparatus;
a registrar configured to register the electrical device in the control apparatus in response to receiving of the registration instruction by the receiver;
an acquirer configured to acquire installation location information indicating a location where the electrical device is installed;
a memory configured to store the installation location information acquired by the acquirer; and
a communicator configured to start monitoring of the electrical device or start control of the electrical device after the electrical device is registered in the control apparatus by the registrar and the installation location information is stored in the memory, the monitoring of the electrical device comprising a process of receiving device information from the electrical device and the control of the electrical device comprising a process of sending control commands to the electrical device, and configured to neither start the monitoring of the electrical device nor start the control of the electrical device before the installation location information is stored in the memory.

4. The installation location setting support system according to claim 3, wherein
neither the monitoring of the electrical device nor the control of the electrical device includes a process using the installation location information.

5. An installation location setting support method, comprising:
receiving from an electrical device to be controlled or monitored by a terminal apparatus via a control apparatus a registration instruction to register the electrical device in the control apparatus;
registering the electrical device in the control apparatus in response to the receiving of the registration instruction;
acquiring installation location information indicating a location where the electrical device is installed;
storing the acquired installation location information; and
starting monitoring of the electrical device or control of the electrical device after the electrical device is registered in the control apparatus and the installation location information is stored, the monitoring of the electrical device comprising a process of receiving device information from the electrical device and the control of the electrical device comprising a process of sending control commands to the electrical device, and neither staring the monitoring of the electrical device nor starting the control of the electrical device before the installation location information is stored.

6. The installation location setting support method according to claim 5, wherein
neither the monitoring of the electrical device nor the control of the electrical device includes a process using the installation location information.

7. A non-transitory recording medium that is readable by a computer of a control apparatus and that records a program allowing the computer to function as:
a receiver configured to receive from an electrical device to be controlled or monitored by a terminal apparatus via the control apparatus a registration instruction to register the electrical device in the control apparatus;
a registrar configured to register the electrical device in the control apparatus in response to receiving of the registration instruction by the receiver;
an acquirer configured to acquire installation location information indicating a location where the electrical device is installed;
a memory configured to store the installation location information acquired by the acquirer; and
a communicator configured to start monitoring of the electrical device or start control of the electrical device after the electrical device is registered in the control apparatus by the registrar and the installation location information is stored in the memory, the monitoring of the electrical device comprising a process of receiving device information from the electrical device and the control of the electrical device comprising a process of sending control commands to the electrical device, and configured to neither start the monitoring of the electrical device nor start the control of the electrical device before the installation location information is stored in the memory.

8. The non-transitory recording medium according to claim 7, wherein
neither the monitoring of the electrical device nor the control of the electrical device includes a process using the installation location information.

* * * * *